(12) United States Patent
Chang

(10) Patent No.: US 10,310,215 B2
(45) Date of Patent: Jun. 4, 2019

(54) LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Hsi-Ling Chang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/616,826

(22) Filed: Feb. 9, 2015

(65) Prior Publication Data

US 2015/0241671 A1  Aug. 27, 2015

(30) Foreign Application Priority Data

Feb. 26, 2014  (TW) .............................. 103106432 A

(51) Int. Cl.
| | |
|---|---|
| *G02B 3/02* | (2006.01) |
| *G02B 13/18* | (2006.01) |
| *G02B 9/60* | (2006.01) |
| *G02B 13/00* | (2006.01) |

(52) U.S. Cl.
CPC .............. *G02B 9/60* (2013.01); *G02B 13/004* (2013.01); *G02B 13/007* (2013.01); *G02B 13/0045* (2013.01)

(58) Field of Classification Search
CPC ...... G02B 13/0045; G02B 13/18; G02B 9/60; G02B 9/62
USPC .................................................. 359/643–830
See application file for complete search history.

(56) References Cited

U.S. PATENT DOCUMENTS

| | | | | |
|---|---|---|---|---|
| 3,770,341 | A * | 11/1973 | Itoh ........................ | G02B 23/00 359/747 |
| 6,538,825 | B1 * | 3/2003 | Sun ....................... | G02B 15/173 359/684 |
| 7,535,659 | B2 | 5/2009 | Sano | |
| 8,179,615 | B1 * | 5/2012 | Tang ................... | G02B 13/0045 359/714 |
| 2004/0012861 | A1 * | 1/2004 | Yamaguchi .......... | G02B 13/004 359/772 |
| 2005/0200967 | A1 * | 9/2005 | Yamasaki .............. | G02B 13/16 359/676 |
| 2009/0034093 | A1 * | 2/2009 | Katakura ............. | G02B 15/177 359/689 |
| 2009/0168192 | A1 * | 7/2009 | Sugita .................... | G02B 13/04 359/680 |

(Continued)

FOREIGN PATENT DOCUMENTS

| | | | |
|---|---|---|---|
| CN | 101131464 A | 2/2008 | |
| JP | 2013077500 | * 4/2013 | |
| JP | WO 2014087855 A1 * | 6/2014 | ............. G02B 13/18 |

*Primary Examiner* — Mahidere S Sahle
(74) *Attorney, Agent, or Firm* — McClure, Qualey & Rodack, LLP

(57) ABSTRACT

A lens assembly includes a fifth lens, a first lens, a second lens, a third lens and a fourth lens, all of which are arranged in sequence from an object side to an image side along an optical axis. The second lens is a biconcave lens. The third lens is a biconvex lens and made of glass material. The fourth lens includes a concave surface facing the object side.

20 Claims, 18 Drawing Sheets

(56) References Cited

U.S. PATENT DOCUMENTS

| | | | | |
|---|---|---|---|---|
| 2011/0273776 A1* | 11/2011 | Obama | ............... | G02B 15/173 |
| | | | | 359/581 |
| 2012/0268625 A1* | 10/2012 | Yamasaki | ............ | G02B 15/173 |
| | | | | 348/240.1 |
| 2013/0003191 A1* | 1/2013 | Kanai | ................. | G02B 15/173 |
| | | | | 359/690 |
| 2014/0192422 A1* | 7/2014 | Tang | ....................... | G02B 9/62 |
| | | | | 359/713 |
| 2014/0300781 A1* | 10/2014 | Yamasaki | ......... | H04N 5/23296 |
| | | | | 348/240.3 |
| 2015/0098135 A1* | 4/2015 | Chung | .................. | G02B 13/18 |
| | | | | 359/713 |
| 2015/0237266 A1* | 8/2015 | Ichikawa | .......... | H04N 5/23296 |
| | | | | 348/240.3 |
| 2016/0077319 A1* | 3/2016 | Yatsu | .................... | G02B 13/16 |
| | | | | 353/98 |

\* cited by examiner

LENS ASSEMBLY

BACKGROUND OF THE INVENTION

1. Field of the Invention

The invention relates to a lens assembly.

2. Description of the Related Art

In order to solve the problem of thermal performance for a lens assembly, all of the lenses of the lens assembly are made of glass material. However, such a lens assembly has problems in that the production cost cannot be reduced and manufacturing and installing the lens assembly are not easy.

BRIEF SUMMARY OF THE INVENTION

The invention provides a lens assembly wherein most lenses are made of plastic material and the rest lenses are made of glass material. Such a lens assembly has no problem of thermal performance, has reduced production cost, and is easy to manufacture and install. Also, the lens assembly of the invention still has a good optical performance and can meet a requirement of resolution.

The lens assembly in accordance with an exemplary embodiment of the invention includes a fifth lens, a first lens, a second lens, a third lens and a fourth lens, all of which are arranged in sequence from an object side to an image side along an optical axis. The second lens is a biconcave lens. The third lens is a biconvex lens and made of glass material. The fourth lens includes a concave surface facing the object side.

In another exemplary embodiment, the first lens includes two surfaces, at least one of which is an aspheric surface or both of which are aspheric surfaces.

In yet another exemplary embodiment, the second lens includes two concave surfaces, at least one of which is an aspheric surface or both of which are aspheric surfaces.

In another exemplary embodiment, the third lens includes two convex surfaces, at least one of which is an aspheric surface or both of which are aspheric surfaces.

In yet another exemplary embodiment, the fourth lens further includes a surface, wherein the surface is an aspheric surface, or the concave surface of the fourth lens is an aspheric surface, or both of the surface and the concave surface of the fourth lens are aspheric surfaces.

In another exemplary embodiment, the lens assembly further includes a stop disposed between the fifth lens and the first lens.

In yet another exemplary embodiment, the fifth lens includes two surfaces, at least one of which is an aspheric surface or both of which are aspheric surfaces.

In another exemplary embodiment, the lens assembly further includes a stop disposed between the fifth lens and the second lens.

In yet another exemplary embodiment, the lens assembly further includes a sixth lens disposed between the fifth lens and the first lens.

In another exemplary embodiment, the fifth lens includes two surfaces, at least one of which is an aspheric surface or both of which are aspheric surfaces.

In yet another exemplary embodiment, the sixth lens includes two surfaces, at least one of which is an aspheric surface or both of which are aspheric surfaces.

In another exemplary embodiment, the first lens is made of plastic material.

In yet another exemplary embodiment, the second lens is made of plastic material.

In another exemplary embodiment, the fourth lens is made of plastic material.

In yet another exemplary embodiment, the fifth lens is made of plastic material.

In another exemplary embodiment, the sixth lens is made of plastic material.

In yet another exemplary embodiment, the lens assembly further includes a stop disposed between the sixth lens and the second lens.

In another exemplary embodiment, the first lens, the second lens, the fourth lens, the fifth lens and the sixth lens are made of plastic material.

The lens assembly in accordance with an another exemplary embodiment of the invention includes a fifth lens, a first lens, a second lens, a third lens and a fourth lens, all of which are arranged in sequence from an object side to an image side along an optical axis. The first lens is a biconvex lens. The second lens is a biconcave lens. The third lens is a biconvex lens and made of glass material. The fourth lens includes a concave surface facing the object side.

In another exemplary embodiment, the lens assembly further includes a stop disposed between the fifth lens and the first lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
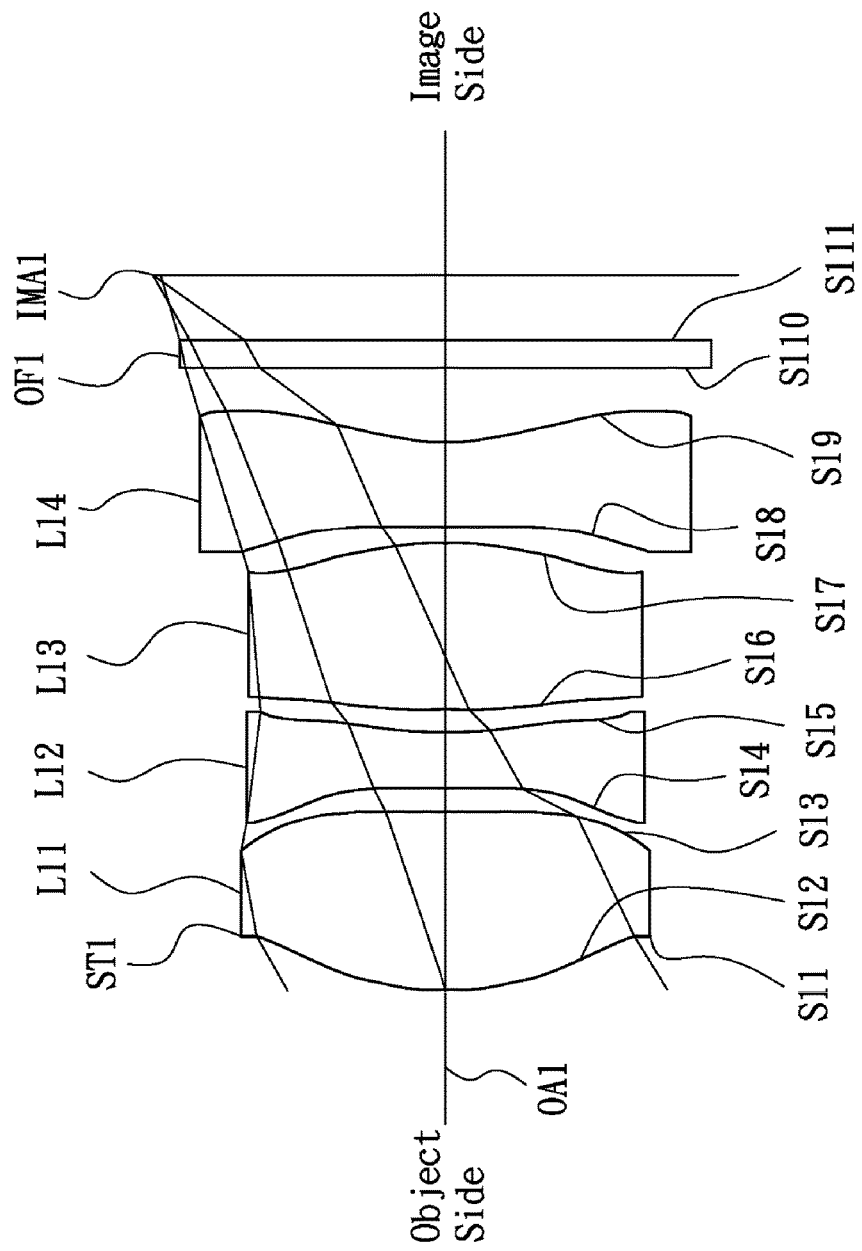
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a stop ST1, a first lens L11, a second lens L12, a third lens L13, a fourth lens L14 and an optical filter OF1, all of which are arranged in sequence from an object side to an image side along an optical axis OA1. In operation, an image of light rays from the object side is formed at an image plane IMA1. The first lens L11 is a biconvex lens and made of plastic material, wherein both of the object side surface S12 and image side surface S13 are aspheric surfaces. The second lens L12 is a biconcave lens and made of plastic material, wherein both of the object side surface S14 and image side surface S15 are aspheric surfaces. The third lens L13 is a biconvex lens and made of glass material, wherein both of the object side surface S16 and image side surface S17 are aspheric surfaces. The fourth lens L14 is made of plastic material, wherein the object side surface S18 is a concave surface, the image side surface S19 is a concave surface and both of the object side surface S18 and image side surface S19 are aspheric surfaces. Both of the object side surface S110 and image side surface S111 of the optical filter OF1 are plane surfaces.

By the above design of the lenses and stop ST1, the lens assembly 1 can effectively solve the problem of thermal performance, correct aberration, maintain good optical performance and meet the requirement of image resolution.

In order to achieve the above purposes and effectively enhance the optical performance, the lens assembly 1 in accordance with the first embodiment of the invention is provided with the optical specifications shown in Table 1, which include the effective focal length, F-number, field of view, radius of curvature of each lens surface, thickness between adjacent surface, refractive index of each lens and Abbe number of each lens. Table 1 shows that the effective focal length is equal to 4.1 mm, F-number is equal to 1.3 and field of view is equal to 120° for the lens assembly 1 of the first embodiment of the invention.

TABLE 1

Effective Focal Length = 4.1 mm
F-number = 1.3
Field of View = 120°

| Surface Number | Radius of Curvature (mm) | Thickness (mm) | Nd | Vd | Remark |
|---|---|---|---|---|---|
| S11 | ∞ | −0.59 | | | Stop ST1 |
| S12 | 3.36 | 1.92 | 1.636 | 23.89 | The First Lens L11 |
| S13 | 23.48 | 0.27 | | | |
| S14 | 20.86 | 0.59 | 1.636 | 23.89 | The Second Lens L12 |
| S15 | 3.51 | 0.24 | | | |
| S16 | 8.61 | 1.81 | 1.804 | 40.89 | The Third Lens L13 |
| S17 | −3.42 | 0.17 | | | |
| S18 | 22.64 | 0.92 | 1.544 | 56.09 | The Fourth Lens L14 |
| S19 | 2.49 | 0.8 | | | |
| S110 | ∞ | 0.3 | 1.5 | 56 | Optical Filter OF1 |
| S111 | ∞ | 0.7 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S12 | −0.058804 | −0.001909 | 0.000622 | −0.000397 | 0.000016 | 0.000007 | 0.000001 | −7.753E−07 |
| S13 | 100.045238 | −0.026439 | 0.001816 | 0.000495 | −0.000781 | 0.000284 | −0.000045 | 0.000003 |
| S14 | −100.002968 | −0.070434 | 0.011034 | 0.003524 | −0.002483 | 0.000695 | −0.000099 | 0.000006 |
| S15 | 1.620541 | −0.053290 | 0.000449 | 0.004843 | −0.003177 | 0.001121 | −0.000211 | 0.000017 |
| S16 | 7.415972 | 0.007139 | −0.005719 | −0.002215 | 0.001938 | −0.000635 | −0.000104 | −0.000006 |
| S17 | −4.636813 | 0.009301 | −0.000492 | −0.000067 | −0.000109 | 0.000029 | 0.000006 | −0.000001 |
| S18 | 96.770029 | −0.030967 | 0.004390 | −0.000065 | −0.000566 | 0.000200 | −0.000022 | 5.4449E−07 |
| S19 | −5.052414 | −0.028229 | 0.007202 | −0.001125 | 0.000005 | 0.000026 | −0.000004 | 1.5579E−07 |

Figure 2A:
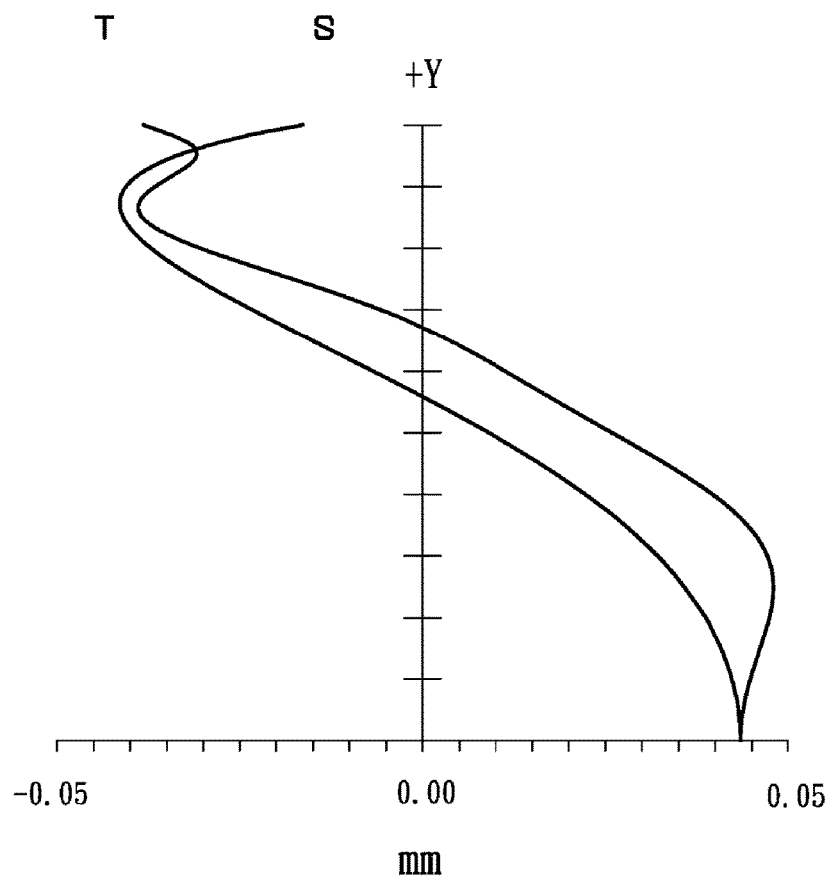
FIG. 2A depicts a field curvature diagram of the lens assembly in accordance with the first embodiment of the invention.
Figure 2B:
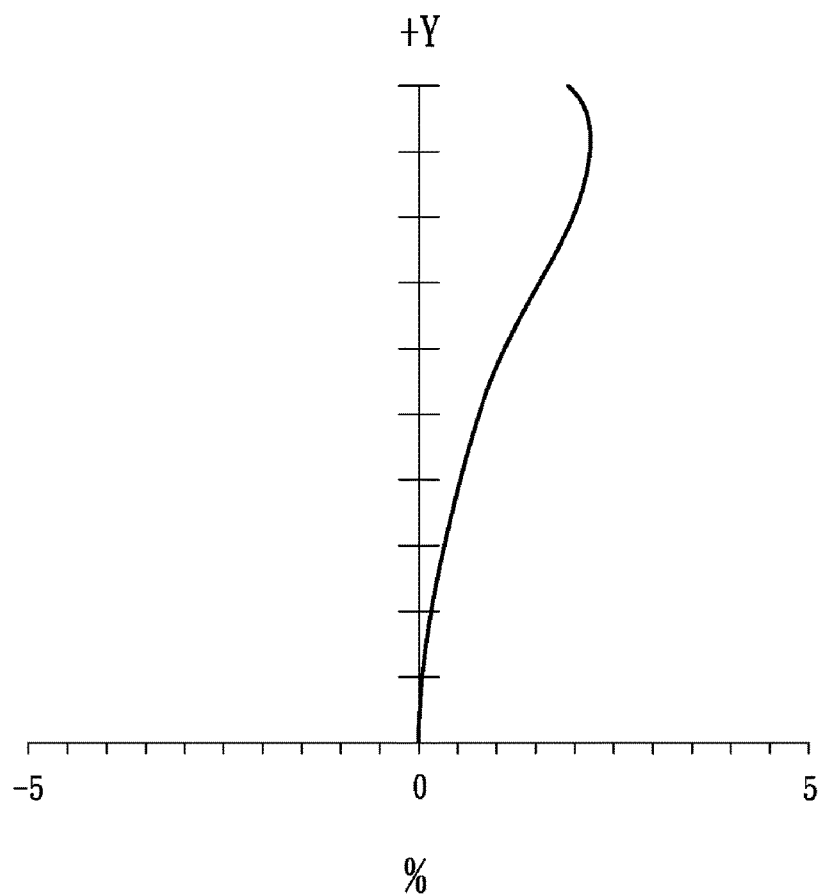
FIG. 2B is a distortion diagram of the lens assembly in accordance with the first embodiment of the invention.
Figure 2C:
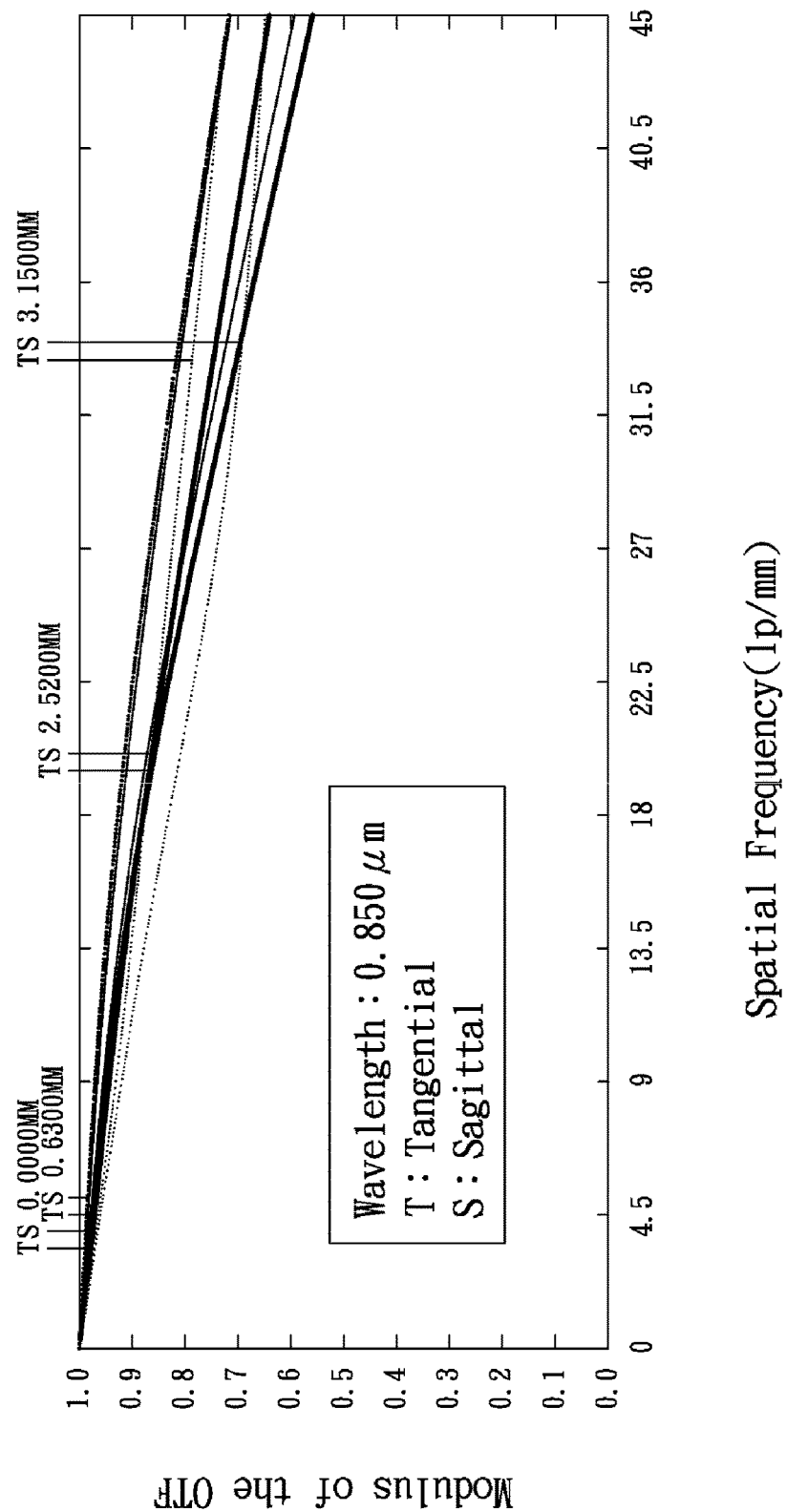
FIG. 2C is a modulation transfer function diagram of the lens assembly in accordance with the first embodiment of the invention.
Figure 2D:
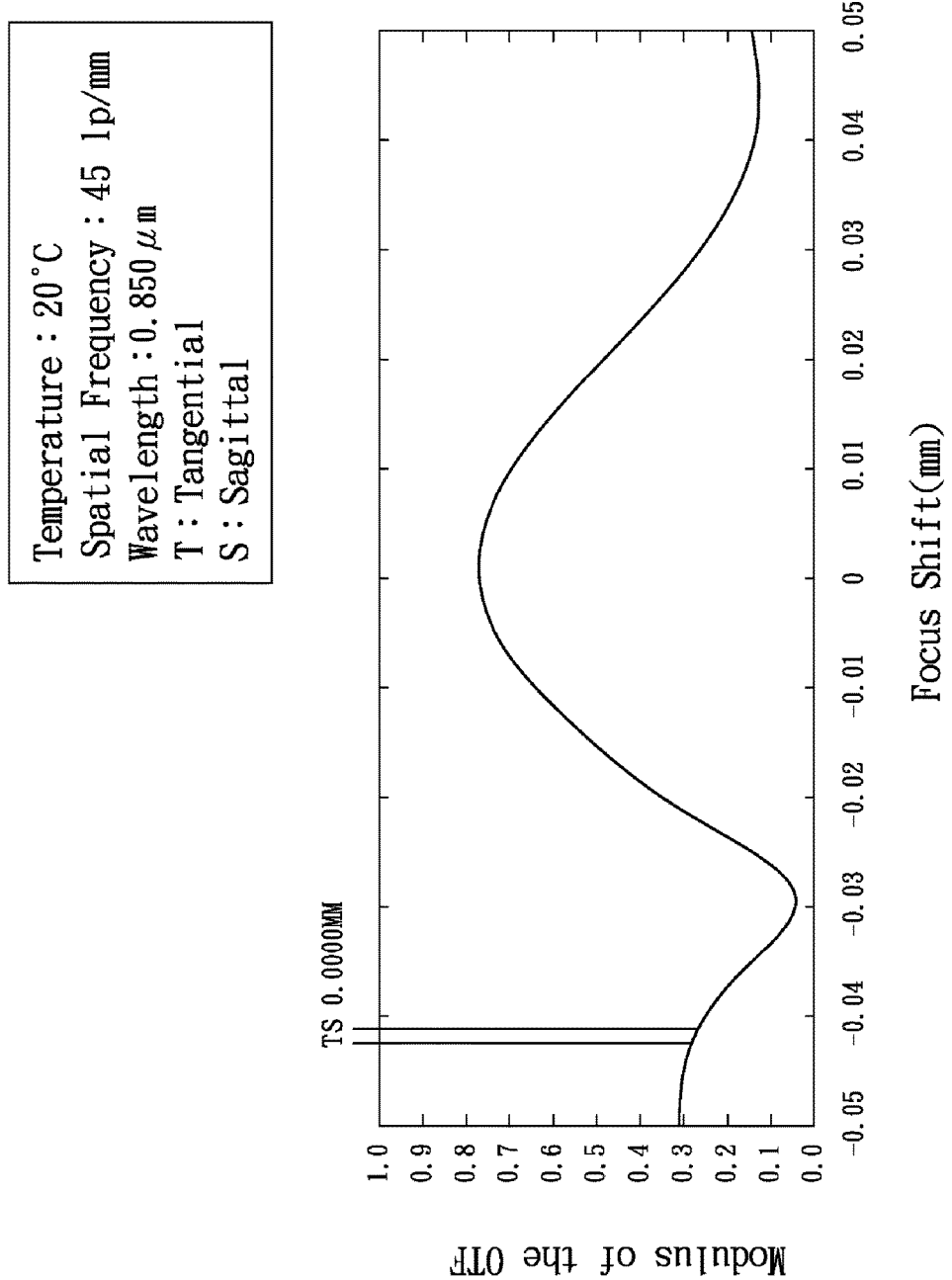
FIG. 2D is a through focus modulation transfer function diagram as temperature is equal to 20° C. for the lens assembly in accordance with the first embodiment of the invention.
Figure 2E:
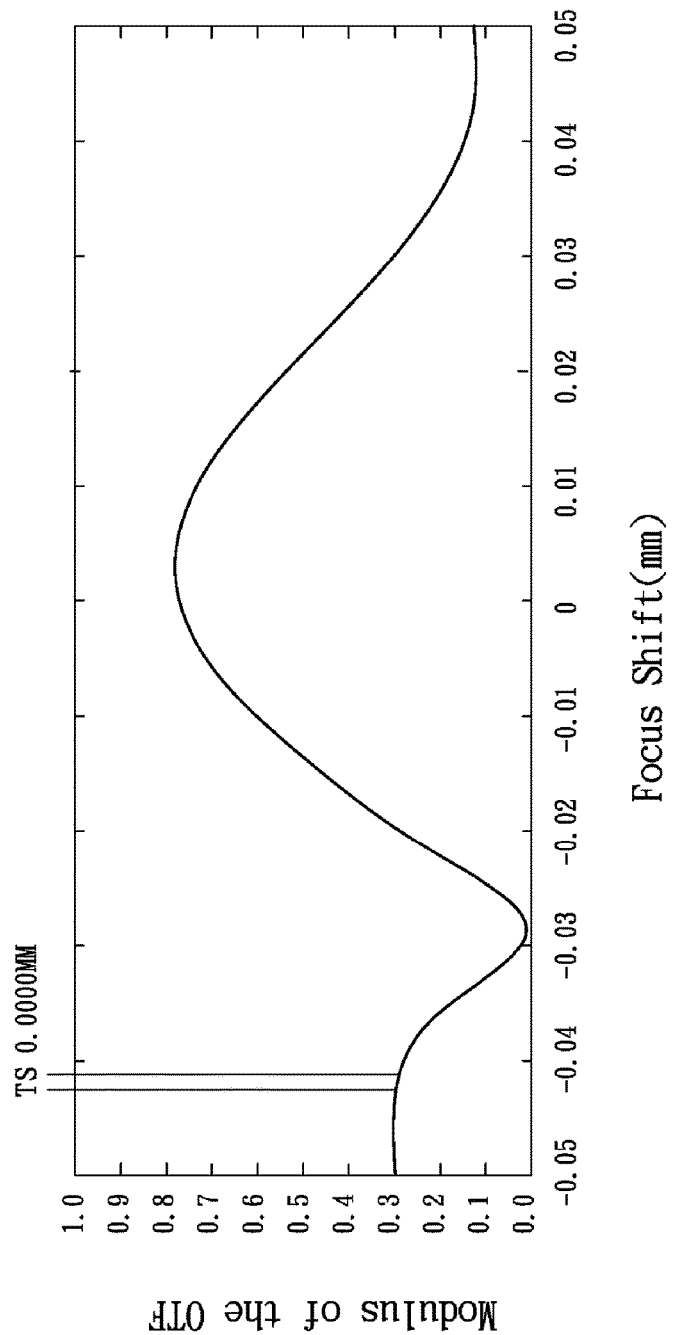
FIG. 2E is a through focus modulation transfer function diagram as temperature is equal to 50° C. for the lens assembly in accordance with the first embodiment of the invention.

By the above arrangements of the lenses and stop ST1, the lens assembly 1 of the first embodiment can meet the requirements of optical performance and thermal performance as seen in FIGS. 2A-2E, wherein FIG. 2A shows a field curvature of the lens assembly 1 in accordance with the first embodiment of the invention, FIG. 2B shows a distortion diagram of the lens assembly 1 in accordance with the first embodiment of the invention, FIG. 2C shows a modulation transfer function diagram of the lens assembly 1 in accordance with the first embodiment of the invention, FIG. 2D shows a through focus modulation transfer function diagram as temperature is equal to 20° C. for the lens assembly 1 in accordance with the first embodiment of the invention and FIG. 2E shows a through focus modulation transfer function diagram as temperature is equal to 50° C. for the lens assembly 1 in accordance with the first embodiment of the invention.

It can be seen from FIG. 2A that the field curvature of tangential direction and sagittal direction in the lens assembly 1 of the first embodiment ranges between −0.045 mm and 0.050 mm for the wavelength of 0.850 μm. It can be seen from FIG. 2B that the distortion in the lens assembly 1 of the first embodiment ranges between 0.0% and 2.5% for the wavelength of 0.850 μm. It can be seen from FIG. 2C that the modulation transfer function of tangential direction and sagittal direction in the lens assembly 1 of the first embodiment ranges between 0.60 and 1.0 wherein the wavelength is 0.850 μm, each field is 0.0000 mm, 0.6300 mm, 2.5200 mm and 3.1500 mm, spatial frequency ranges between 0 lp/mm and 45 lp/mm. It can be seen from FIG. 2D that the through focus modulation transfer function of tangential direction and sagittal direction in the lens assembly 1 of the first embodiment has maximum modulation transfer function value as focus shift is equal to 0 mm wherein the wavelength is 0.850 μm, field is 0.0000 mm, spatial frequency is equal to 45 lp/mm, and temperature is equal to 20° C. It can be seen from FIG. 2E that the through focus modulation transfer function of tangential direction and sagittal direction in the lens assembly 1 of the first embodiment has maximum modulation transfer function value as focus shift is about equal to 0.0033 mm wherein the wavelength is 0.850 μm, field is 0.0000 mm, spatial frequency is equal to 45 lp/mm, and temperature is equal to 50° C. It can be seen from FIG. 2D and FIG. 2E that the focus shift is about equal to 0.11 μm/° C. in the lens assembly 1 of the first embodiment as temperature increases from 20° C. to 50° C. It is obvious that the field curvature and the distortion of the lens assembly 1 of the first embodiment can be corrected effectively, the image resolution and thermal performance can meet the requirements. Therefore, the lens assembly 1 of the first embodiment is capable of good optical performance.

Figure 3:
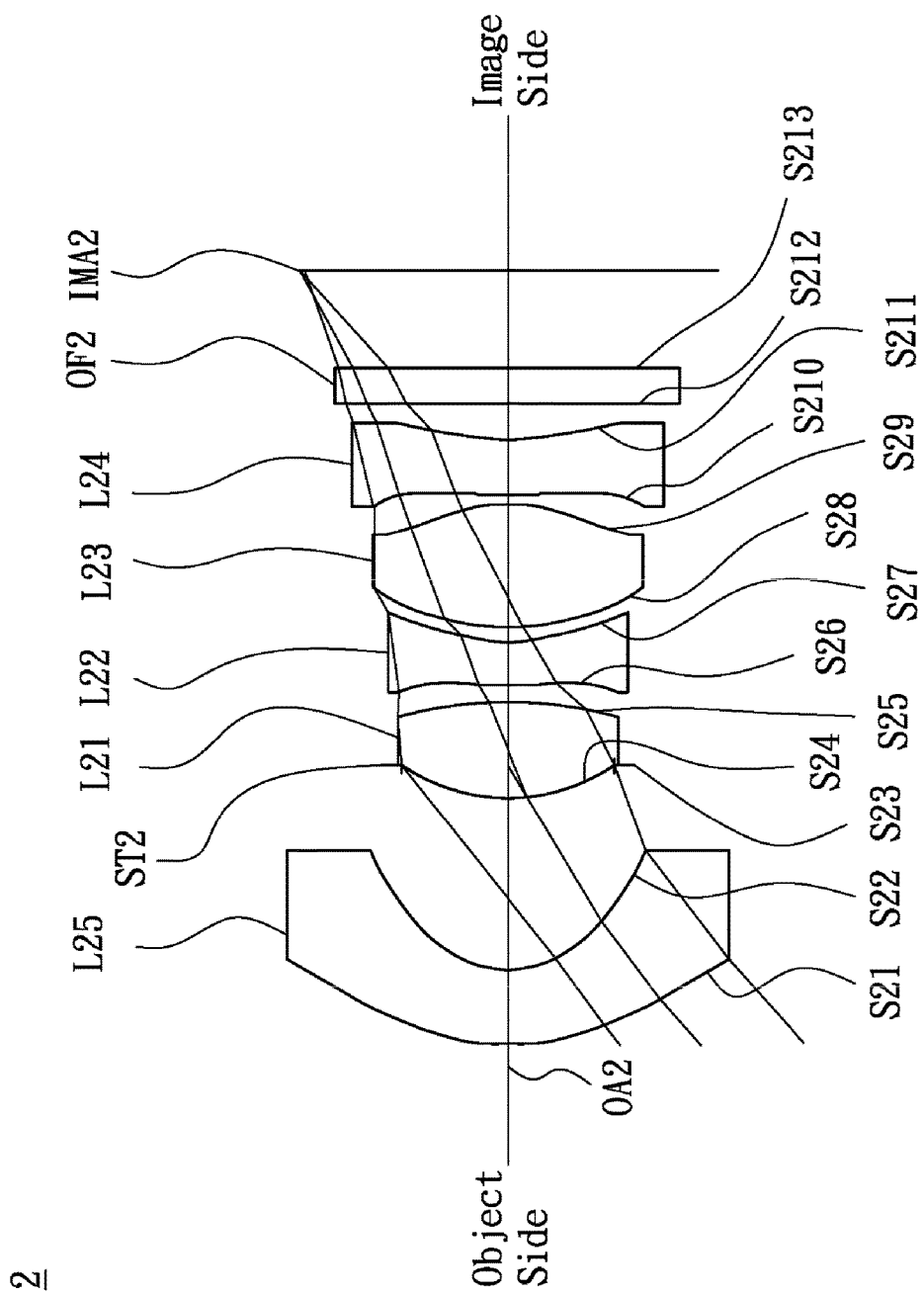
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a fifth lens L25, a stop ST2, a first lens L21, a second lens L22, a third lens L23, a fourth lens L24 and an optical filter OF2, all of which are arranged in sequence from an object side to an image side along an optical axis OA2. In operation, an image of light rays from the object side is formed at an image plane IMA2. The fifth lens L25 is a meniscus lens and made of plastic material, wherein the object side surface S21 is a convex surface, the image side surface S22 is a concave surface and both of the object side surface S21 and image side surface S22 are aspheric surfaces. The first lens L21 is a biconvex lens and made of plastic material, wherein both of the object side surface S24 and image side surface S25 are aspheric surfaces. The second lens L22 is a biconcave lens and made of plastic material, wherein both of the object side surface S26 and image side surface S27 are aspheric surfaces. The third lens L23 is a biconvex lens and made of glass material, wherein both of the object side surface S28 and image side surface S29 are aspheric surfaces. The fourth lens L24 is made of plastic material, wherein the object side surface S210 is a concave surface, the image side surface S211 is a concave surface and both of the object side surface S210 and image side surface S211 are aspheric surfaces. Both of the object side surface S212 and image side surface S213 of the optical filter OF2 are plane surfaces.

By the above design of the lenses and stop ST2, the lens assembly 2 can effectively solve the problem of thermal performance, correct aberration, maintain good optical performance and meet the requirement of image resolution.

In order to achieve the above purposes and effectively enhance the optical performance, the lens assembly 2 in accordance with the second embodiment of the invention is provided with the optical specifications shown in Table 3, which include the effective focal length, F-number, field of view, radius of curvature of each lens surface, thickness between adjacent surface, refractive index of each lens and Abbe number of each lens. Table 3 shows that the effective focal length is equal to 1.34 mm, F-number is equal to 1.6 and field of view is equal to 144° for the lens assembly 2 of the second embodiment of the invention.

TABLE 3

Effective Focal Length = 1.34 mm
F-number = 1.6
Field of View = 144°

| Surface Number | Radius of Curvature (mm) | Thickness (mm) | Nd | Vd | Remark |
|---|---|---|---|---|---|
| S21 | 1.219993 | 0.427714 | 1.534 | 56 | The Fifth Lens L25 |
| S22 | 0.536677 | 1.178114 | | | |
| S23 | ∞ | −0.187158 | | | Stop ST2 |
| S24 | 1.083945 | 0.548184 | 1.534 | 56 | The First Lens L21 |
| S25 | −2.928161 | 0.1 | | | |
| S26 | 2.079373 | 0.246952 | 1.612 | 26.29 | The Second Lens L22 |
| S27 | 0.722024 | 0.087564 | | | |
| S28 | 1.382242 | 0.708689 | 1.592 | 67.19 | The Third Lens L23 |
| S29 | −0.926232 | 0.053121 | | | |
| S210 | 3.832610 | 0.317775 | 1.612 | 26.29 | The Fourth Lens L24 |
| S211 | 1.237753 | 0.207080 | | | |
| S212 | ∞ | 0.21 | 1.5 | 54 | Optical Filter OF2 |
| S213 | ∞ | 0.552128 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C | D | E | F | G |
|---|---|---|---|---|---|---|---|---|
| S21 | −0.694160 | −0.097324 | 0.005794 | −0.000640 | 0 | 0 | 0 | 0 |

TABLE 4-continued

| Surface Number | k | A | B | C | D | E | F | G |
|---|---|---|---|---|---|---|---|---|
| S22 | −1.073163 | 0.217836 | 0.120490 | 0.136987 | 0 | 0 | 0 | 0 |
| S24 | −0.064752 | −0.018269 | 0.411204 | −0.733814 | 0 | 0 | 0 | 0 |
| S25 | 1.339428 | −0.174064 | 1.159769 | −2.206076 | 0 | 0 | 0 | 0 |
| S26 | −87.315508 | −0.815321 | 1.772638 | −3.122060 | 0 | 0 | 0 | 0 |
| S27 | −7.970520 | −0.100325 | 0.008587 | 0.304068 | 0 | 0 | 0 | 0 |
| S28 | 0 | −0.279092 | 0.530369 | −0.239221 | 0 | 0 | 0 | |
| S29 | 0 | 0.617977 | −0.467260 | 0.887943 | 0 | 0 | 0 | 0 |
| S210 | 0 | −0.328287 | 0.007636 | −0.194721 | −0.069393 | 0 | 0 | 0 |
| S211 | −8.347093 | −0.247464 | 0.254505 | −0.315575 | 0.152627 | 0 | 0 | 0 |

Figure 4A:
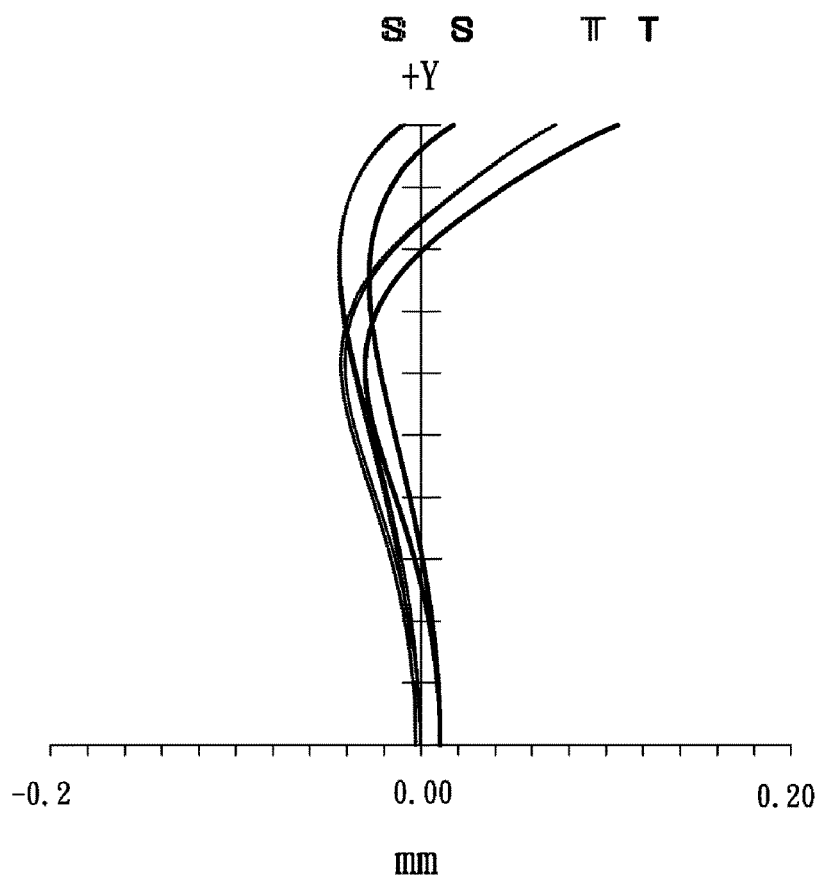
FIG. 4A depicts a field curvature diagram of the lens assembly in accordance with the second embodiment of the invention.
Figure 4B:
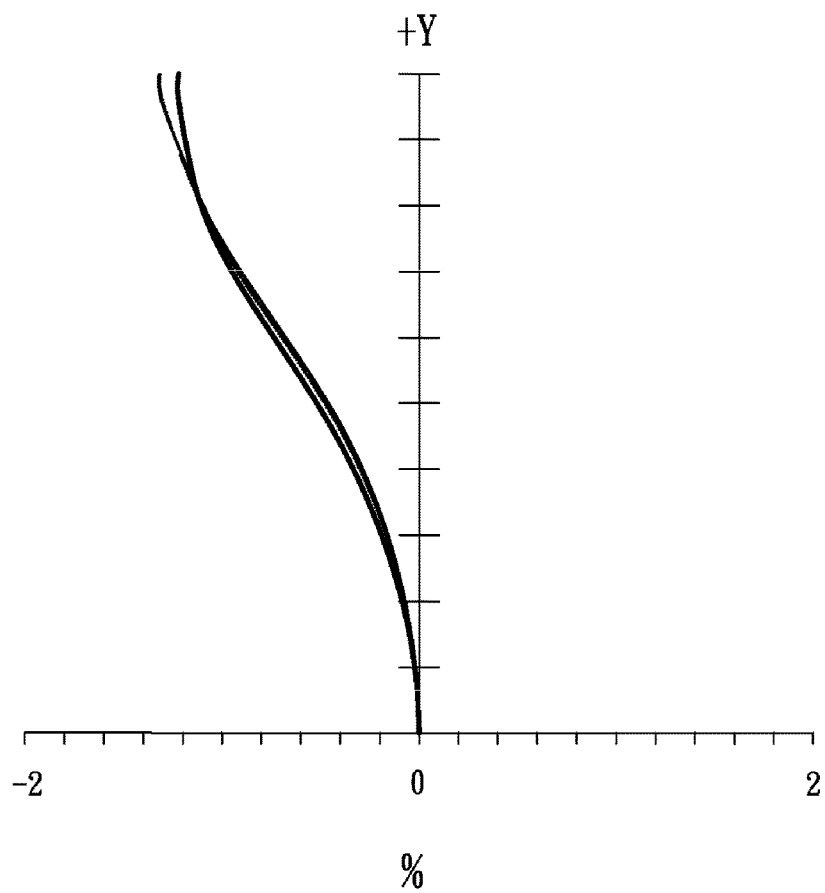
FIG. 4B is a distortion diagram of the lens assembly in accordance with the second embodiment of the invention.
Figure 4C:
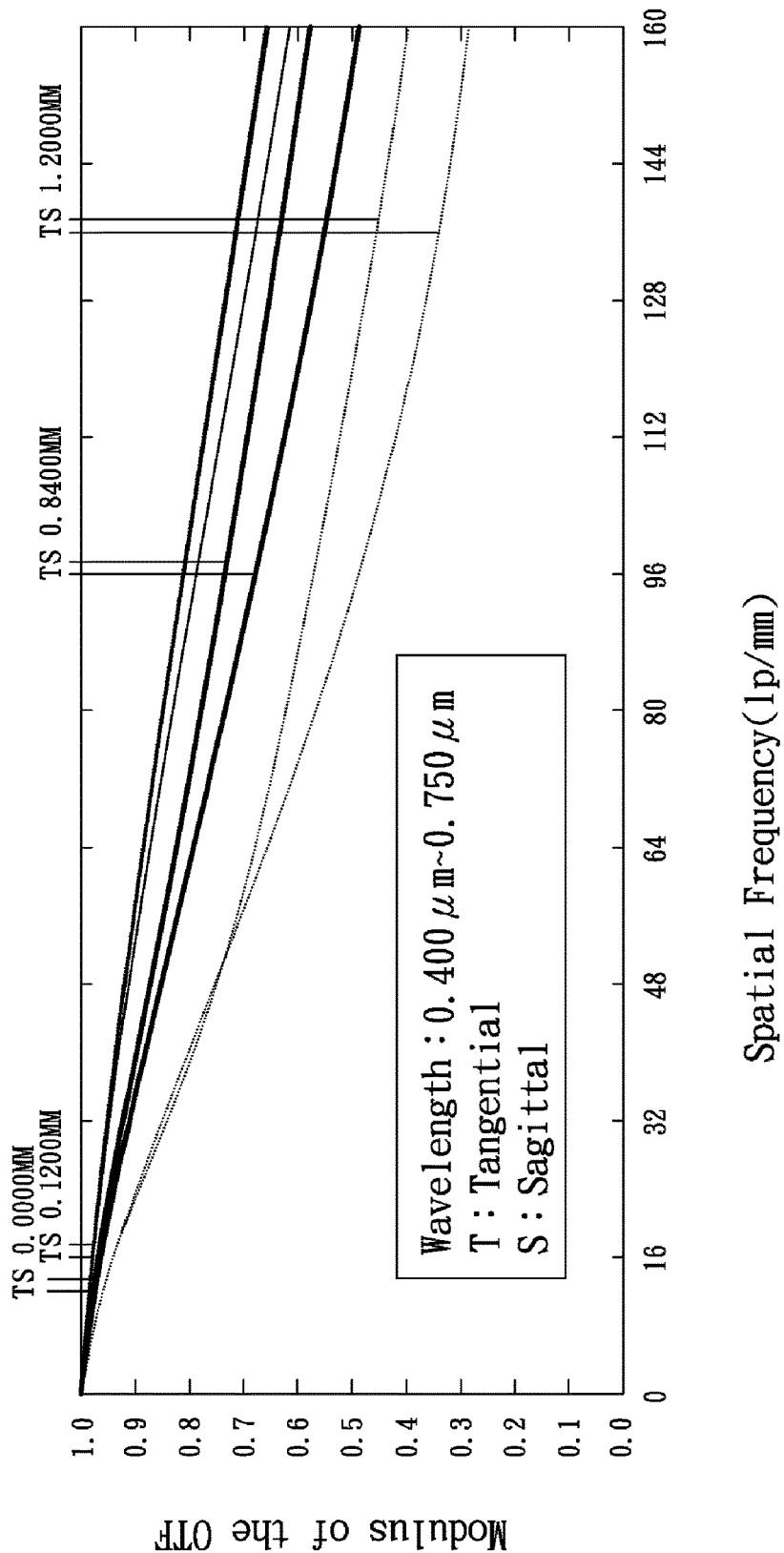
FIG. 4C is a modulation transfer function diagram of the lens assembly in accordance with the second embodiment of the invention.
Figure 4D:
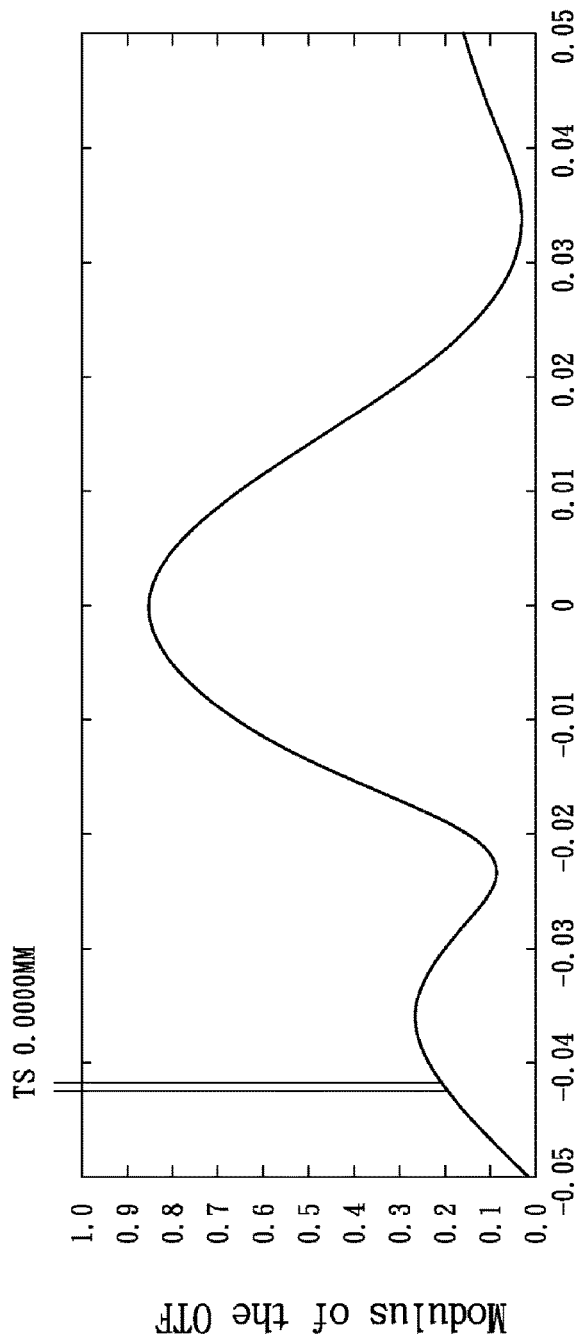
FIG. 4D is a through focus modulation transfer function diagram as temperature is equal to 20° C. for the lens assembly in accordance with the second embodiment of the invention.
Figure 4E:
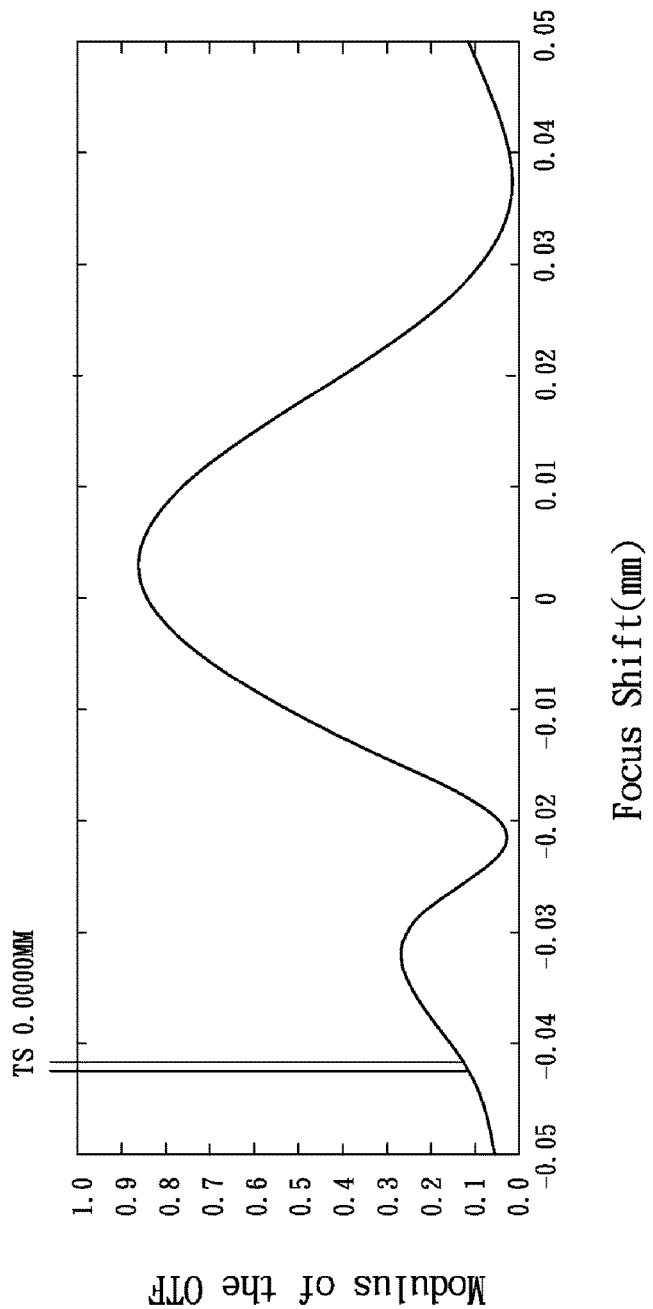
FIG. 4E is a through focus modulation transfer function diagram as temperature is equal to 50° C. for the lens assembly in accordance with the second embodiment of the invention.

By the above arrangements of the lenses and stop ST2, the lens assembly 2 of the second embodiment can meet the requirements of optical performance and thermal performance as seen in FIGS. 4A-4E, wherein FIG. 4A shows a field curvature of the lens assembly 2 in accordance with the second embodiment of the invention, FIG. 4B shows a distortion diagram of the lens assembly 2 in accordance with the second embodiment of the invention, FIG. 4C shows a modulation transfer function diagram of the lens assembly 2 in accordance with the second embodiment of the invention, FIG. 4D shows a through focus modulation transfer function diagram as temperature is equal to 20° C. for the lens assembly 2 in accordance with the second embodiment of the invention and FIG. 4E shows a through focus modulation transfer function diagram as temperature is equal to 50° C. for the lens assembly 2 in accordance with the second embodiment of the invention.

It can be seen from FIG. 4A that the field curvature of tangential direction and sagittal direction in the lens assembly 2 of the second embodiment ranges between −0.06 mm and 0.12 mm for the wavelength of 0.400 μm, 0.555 μm and 0.750 μm. It can be seen from FIG. 4B that the distortion in the lens assembly 2 of the second embodiment ranges between −1.4% and 0.0% for the wavelength of 0.400 μm, 0.555 μm and 0.750 μm. It can be seen from FIG. 4C that the modulation transfer function of tangential direction and sagittal direction in the lens assembly 2 of the second embodiment ranges between 0.28 and 1.0 wherein the wavelength ranges between 0.400 μm and 0.750 μm, each field is 0.0000 mm, 0.1200 mm, 0.8400 mm and 1.2000 mm, spatial frequency ranges between 0 lp/mm and 160 lp/mm. It can be seen from FIG. 4D that the through focus modulation transfer function of tangential direction and sagittal direction in the lens assembly 2 of the second embodiment has maximum modulation transfer function value as focus shift is equal to 0 mm wherein the wavelength ranges between 0.400 μm and 0.750 μm, field is 0.0000 mm, spatial frequency is equal to 80 lp/mm, and temperature is equal to 20° C. It can be seen from FIG. 4E that the through focus modulation transfer function of tangential direction and sagittal direction in the lens assembly 2 of the second embodiment has maximum modulation transfer function value as focus shift is about equal to 0.003 mm wherein the wavelength ranges between 0.400 μm and 0.750 μm, field is 0.0000 mm, spatial frequency is equal to 80 lp/mm, and temperature is equal to 50° C. It can be seen from FIG. 4D and FIG. 4E that the focus shift is about equal to 0.1 μm/° C. in the lens assembly 2 of the second embodiment as temperature increases from 20° C. to 50° C. It is obvious that the field curvature and the distortion of the lens assembly 2 of the second embodiment can be corrected effectively, the image resolution and thermal performance can meet the requirements. Therefore, the lens assembly 2 of the second embodiment is capable of good optical performance.

Figure 5:
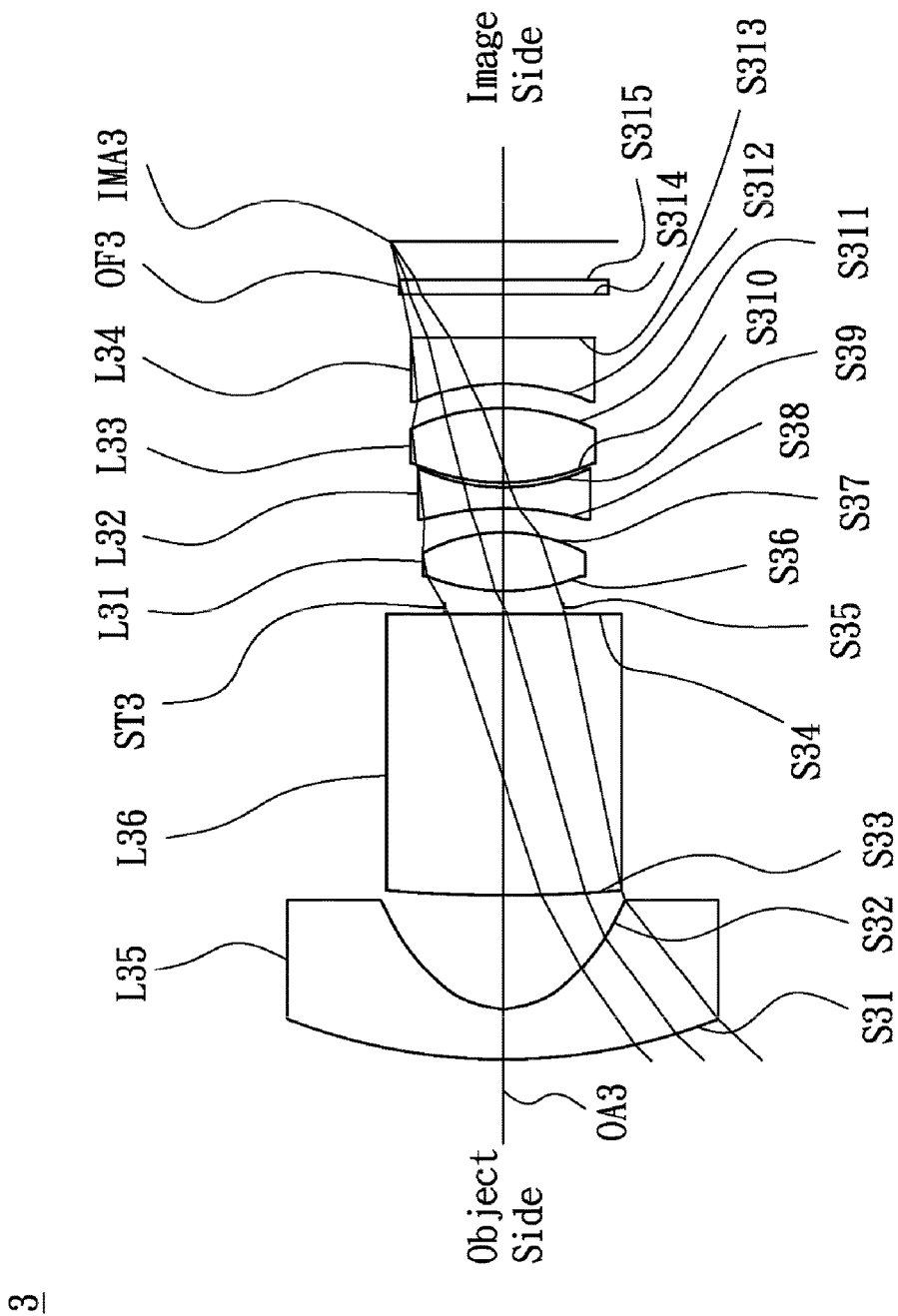
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a fifth lens L35, a sixth lens L36, a stop ST3, a first lens L31, a second lens L32, a third lens L33, a fourth lens L34 and an optical filter OF3, all of which are arranged in sequence from an object side to an image side along an optical axis OA3. In operation, an image of light rays from the object side is formed at an image plane IMA3. The fifth lens L35 is a meniscus lens and made of plastic material, wherein the object side surface S31 is a convex surface, the image side surface S32 is a concave surface and both of the object side surface S31 and image side surface S32 are aspheric surfaces. The sixth lens L36 is made of plastic material, wherein the object side surface S33 is a convex surface, the image side surface S34 is a convex surface (look like a plane surface) and both of the object side surface S33 and image side surface S34 are aspheric surfaces. The first lens L31 is a biconvex lens and made of plastic material, wherein both of the object side surface S36 and image side surface S37 are aspheric surfaces. The second lens L32 is a biconcave lens and made of plastic material, wherein both of the object side surface S38 and image side surface S39 are aspheric surfaces. The third lens L33 is a biconvex lens and made of glass material, wherein both of the object side surface S310 and image side surface S311 are spherical surfaces. The fourth lens L34 is made of plastic material, wherein the object side surface S312 is a concave surface, the image side surface S313 is a concave surface (look like a plane surface) and both of the object side surface S312 and image side surface S313 are aspheric surfaces. Both of the object side surface S314 and image side surface S315 of the optical filter OF3 are plane surfaces.

By the above design of the lenses and stop ST3, the lens assembly 3 can effectively solve the problem of thermal performance, correct aberration, maintain good optical performance and meet the requirement of image resolution.

In order to achieve the above purposes and effectively enhance the optical performance, the lens assembly 3 in accordance with the third embodiment of the invention is provided with the optical specifications shown in Table 5, which include the effective focal length, F-number, field of view, radius of curvature of each lens surface, thickness between adjacent surface, refractive index of each lens and Abbe number of each lens. Table 3 shows that the effective focal length is equal to 2.777 mm, F-number is equal to 2.0 and field of view is equal to 168° for the lens assembly 3 of the third embodiment of the invention.

TABLE 5

Effective Focal Length = 2.777 mm
F-number = 2.0
Field of View = 168°

| Surface Number | Radius of Curvature (mm) | Thickness (mm) | Nd | Vd | Remark |
|---|---|---|---|---|---|
| S31 | 13.070438 | 1.398 | 1.534 | 56.07 | The Fifth Lens L35 |
| S32 | 2.193243 | 3.036 | | | |
| S33 | 16.812734 | 7.589 | 1.614 | 25.57 | The Sixth Lens L36 |
| S34 | −56.910637 | 0.168 | | | |
| S35 | ∞ | 0.435 | | | Stop ST3 |
| S36 | 4.628216 | 1.576 | 1.534 | 56.07 | The First Lens L31 |
| S37 | −4.677102 | 0.648 | | | |
| S38 | −7.706641 | 0.574 | 1.614 | 25.57 | The Second Lens L32 |
| S39 | 5.936748 | 0.106 | | | |
| S310 | 5.769723 | 2.016 | 1.693 | 53.20 | The Third Lens L33 |
| S311 | −5.769723 | 0.648 | | | |
| S312 | −9.088463 | 1.258 | 1.614 | 25.57 | The Fourth Lens L34 |
| S313 | 96.310159 | 1.162 | | | |
| S314 | ∞ | 0.4 | 1.5 | 54 | Optical Filter OF3 |
| S315 | ∞ | 1 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| Surface Number | k | A | B | C | D | E | F | G |
|---|---|---|---|---|---|---|---|---|
| S31 | −2.274595 | −0.000115 | −0.000002 | 9.4621E−08 | 0 | 0 | 0 | 0 |
| S32 | −0.940345 | 0.002074 | 0.000093 | 0.000003 | 0 | 0 | 0 | 0 |
| S33 | −9.283708 | −0.001434 | 0.000065 | −0.000007 | 0 | 0 | 0 | 0 |
| S34 | −134.824538 | −0.002515 | 0.000833 | −0.000004 | 0 | 0 | 0 | 0 |
| S36 | −3.147746 | −0.002869 | 0.000678 | −0.000027 | 0 | 0 | 0 | 0 |
| S37 | −0.073438 | −0.000805 | 0.000293 | −0.000028 | 0 | 0 | 0 | 0 |
| S38 | −24.522163 | −0.002088 | 0.000315 | −0.000145 | 0 | 0 | 0 | 0 |
| S39 | −0.112862 | 0.005741 | −0.000860 | 0.000024 | 0 | 0 | 0 | 0 |
| S312 | 45.446473 | −0.010697 | 0.000315 | 0.000034 | 0 | 0 | 0 | 0 |
| S313 | 1421.828203 | −0.003067 | 0.000101 | 0.000041 | 0 | 0 | 0 | 0 |

Figure 6A:
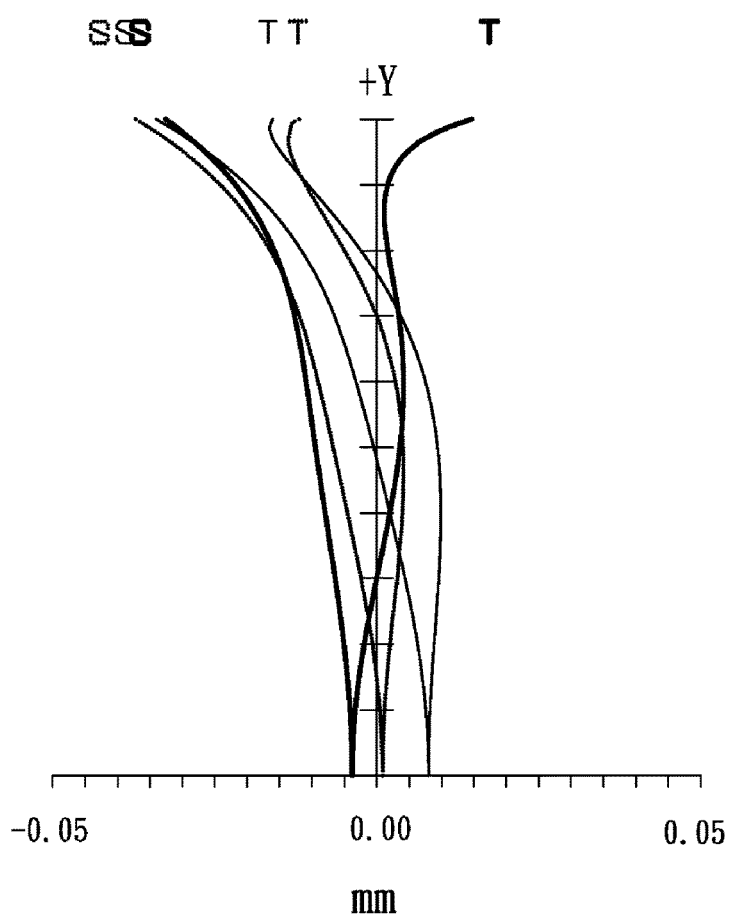
FIG. 6A depicts a field curvature diagram of the lens assembly in accordance with the third embodiment of the invention.
Figure 6B:
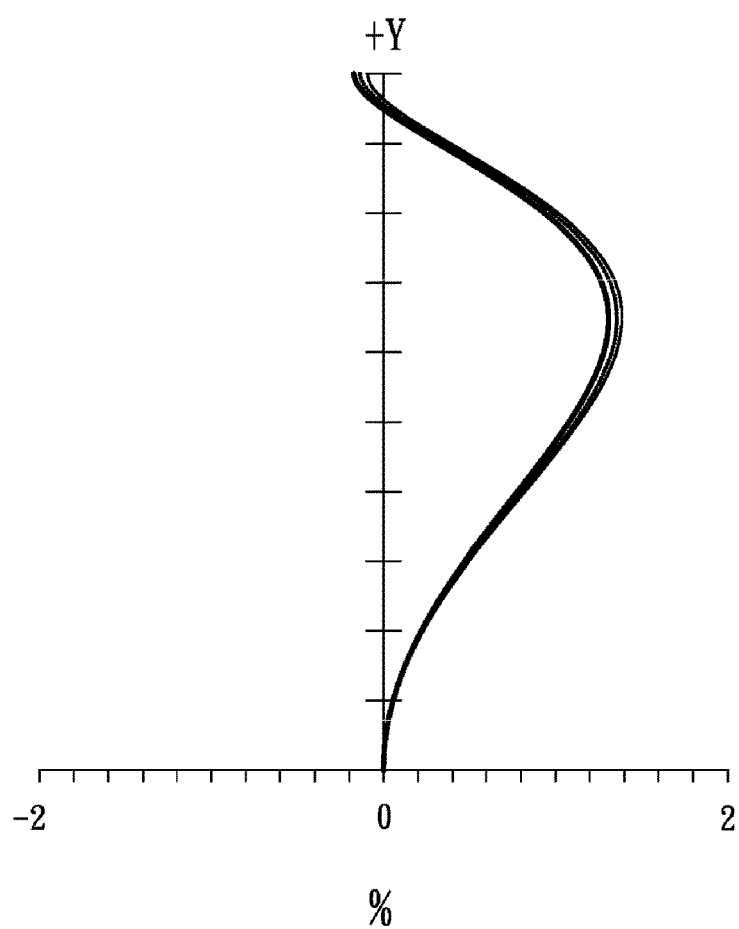
FIG. 6B is a distortion diagram of the lens assembly in accordance with the third embodiment of the invention.
Figure 6C:
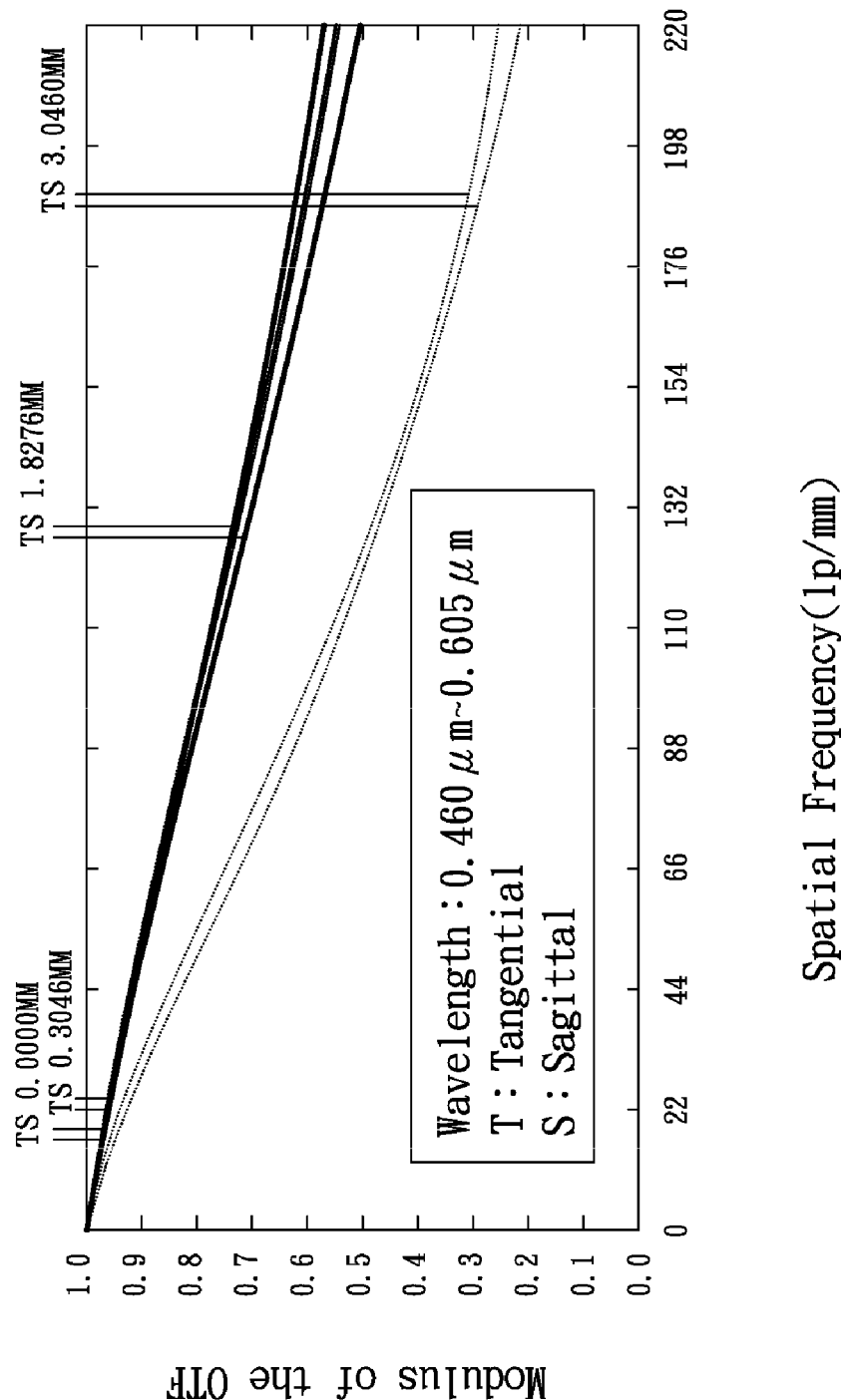
FIG. 6C is a modulation transfer function diagram of the lens assembly in accordance with the third embodiment of the invention.
Figure 6D:
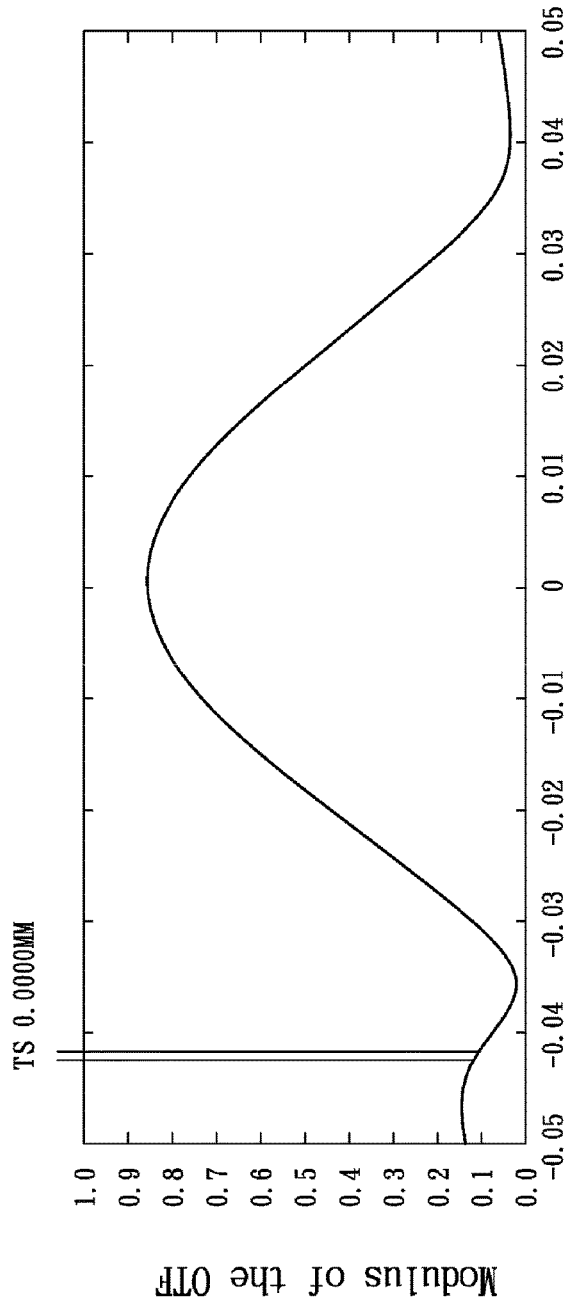
FIG. 6D is a through focus modulation transfer function diagram as temperature is equal to 20° C. for the lens assembly in accordance with the third embodiment of the invention.
Figure 6E:
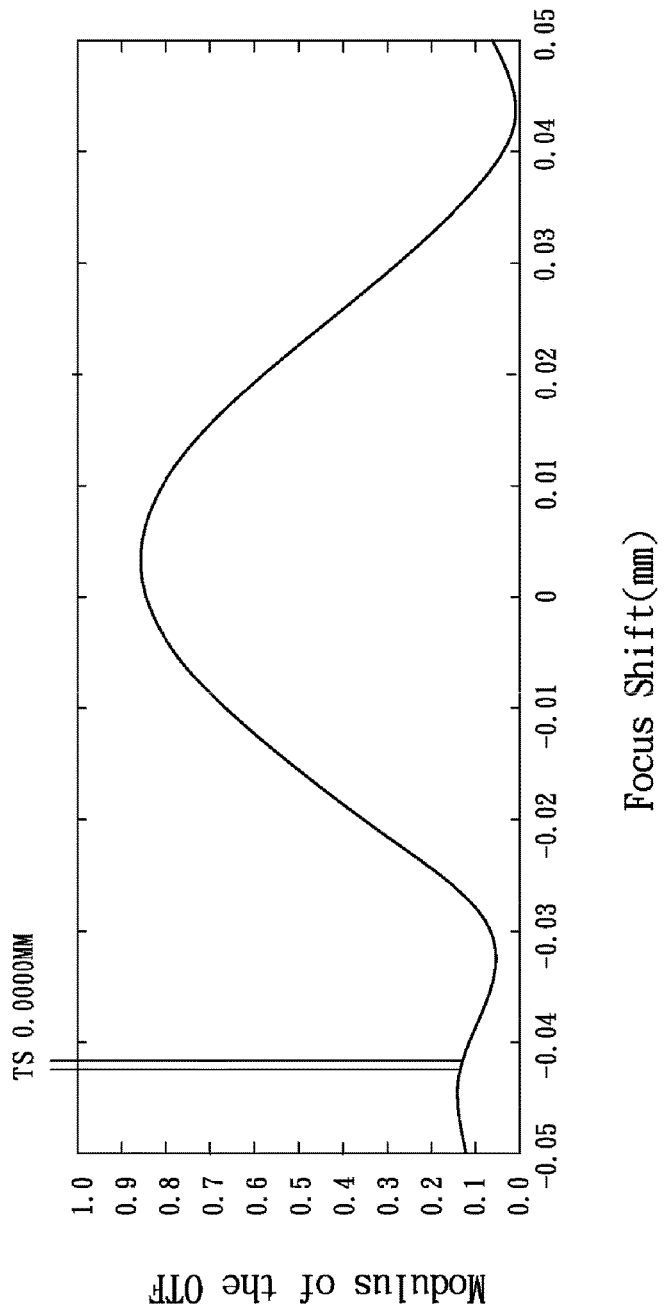
FIG. 6E is a through focus modulation transfer function diagram as temperature is equal to 50° C. for the lens assembly in accordance with the third embodiment of the invention.

By the above arrangements of the lenses and stop ST3, the lens assembly 3 of the third embodiment can meet the requirements of optical performance and thermal performance as seen in FIGS. 6A-6E, wherein FIG. 6A shows a field curvature of the lens assembly 3 in accordance with the third embodiment of the invention, FIG. 6B shows a distortion diagram of the lens assembly 3 in accordance with the third embodiment of the invention, FIG. 6C shows a modulation transfer function diagram of the lens assembly 3 in accordance with the third embodiment of the invention, FIG. 6D shows a through focus modulation transfer function diagram as temperature is equal to 20° C. for the lens assembly 3 in accordance with the third embodiment of the invention and FIG. 6E shows a through focus modulation transfer function diagram as temperature is equal to 50° C. for the lens assembly 3 in accordance with the third embodiment of the invention.

It can be seen from FIG. 6A that the field curvature of tangential direction and sagittal direction in the lens assembly 3 of the third embodiment ranges between −0.040 mm and 0.015 mm for the wavelength of 0.460 µm, 0.540 µm and 0.605 µm. It can be seen from FIG. 6B that the distortion in the lens assembly 3 of the third embodiment ranges between −0.2% and 1.4% for the wavelength of 0.460 µm, 0.540 µm and 0.605 µm. It can be seen from FIG. 6C that the modulation transfer function of tangential direction and sagittal direction in the lens assembly 3 of the third embodiment ranges between 0.21 and 1.0 wherein the wavelength ranges between 0.460 µm and 0.605 µm, each field is 0.0000 mm, 0.3046 mm, 1.8276 mm and 3.0460 mm, spatial frequency ranges between 0 lp/mm and 220 lp/mm. It can be seen from FIG. 6D that the through focus modulation transfer function of tangential direction and sagittal direction in the lens assembly 3 of the third embodiment has maximum modulation transfer function value as focus shift is equal to 0 mm wherein the wavelength ranges between 0.460 µm and 0.605 µm, field is 0.0000 mm, spatial frequency is equal to 75 lp/mm, and temperature is equal to 20° C. It can be seen from FIG. 6E that the through focus modulation transfer function of tangential direction and sagittal direction in the lens assembly 3 of the third embodiment has maximum modulation transfer function value as focus shift is about equal to 0.0033 mm wherein the wavelength ranges between 0.460 µm and 0.605 µm, field is 0.0000 mm, spatial frequency is equal to 75 lp/mm, and temperature is equal to 50° C. It can be seen from FIG. 6D and FIG. 6E that the focus shift is about equal to 0.11 µm/° C. in the lens assembly 3 of the third embodiment as temperature increases from 20° C. to 50° C. It is obvious that the field curvature and the distortion of the lens assembly 3 of the third embodiment can be corrected effectively, the image resolution and thermal performance can meet the requirements. Therefore, the lens assembly 3 of the third embodiment is capable of good optical performance.

In the above first embodiment, both of the object side surface and image side surface of the first, second, third and fourth lens are aspheric surfaces. However, it has the same effect and falls into the scope of the invention that any of the object side surfaces or image side surfaces of the first, second, third and fourth lens are changed into spherical surfaces.

In the above second embodiment, both of the object side surface and image side surface of the fifth, first, second, third and fourth lens are aspheric surfaces. However, it has the same effect and falls into the scope of the invention that any of the object side surfaces or image side surfaces of the fifth, first, second, third and fourth lens are changed into spherical surfaces.

In the above second embodiment, the stop ST2 is disposed between the fifth lens L25 and the first lens L21. However, it has the same effect and falls into the scope of the invention that the stop ST2 is disposed between the first lens L21 and the second lens L22.

In the above third embodiment, both of the object side surface and image side surface of the sixth, fifth, first, second and fourth lens are aspheric surfaces, both of the object side surface and image side surface of the third lens are spherical surfaces. However, it has the same effect and falls into the scope of the invention that any of the object side surfaces or image side surfaces of the sixth, fifth, first, second and fourth lens are changed into spherical surfaces and/or at least one of the object side surface or image side surface of the first lens is changed into aspheric surface.

In the above third embodiment, the stop ST3 is disposed between the sixth lens L36 and the first lens L31. However, it has the same effect and falls into the scope of the invention that the stop ST3 is disposed between the first lens L31 and the second lens L32.

What is claimed is:

1. A lens assembly consisting of:
    a fifth lens which comprises a convex surface facing an object side and a concave surface facing an image side;
    a stop;
    a first lens which comprises a convex surface facing the image side;
    a second lens which is a biconcave lens;
    a third lens which is a biconvex lens and made of glass material; and
    a fourth lens which comprises a concave surface facing the object side;
    wherein the fifth lens, the stop, the first lens, the second lens, the third lens and the fourth lens are arranged in sequence from the object side to the image side along an optical axis;
    wherein the fifth lens is closer to the object side than the first lens, the second lens, the third lens and the fourth lens;
    wherein the first lens is disposed between the stop and the second lens;
    wherein the lens assembly is a fixed-focus lens assembly;
    wherein the lens assembly satisfies:

$1.6 \leq F \leq 2.0$ wherein F is an f-number of the lens assembly.

2. The lens assembly as claimed in claim 1, wherein the first lens further comprises a surface, wherein the surface is an aspheric surface, or the convex surface of the first lens is an aspheric surface, or both of the surface and the convex surface of the first lens are aspheric surfaces.

3. The lens assembly as claimed in claim 1, wherein the second lens comprises two concave surfaces, at least one of which is an aspheric surface or both of which are aspheric surfaces.

4. The lens assembly as claimed in claim 1, wherein the third lens comprises two convex surfaces, at least one of which is an aspheric surface or both of which are aspheric surfaces.

5. The lens assembly as claimed in claim 1, wherein the fourth lens further comprises a surface, wherein the surface is an aspheric surface, or the concave surface of the fourth lens is an aspheric surface, or both of the surface and the concave surface of the fourth lens are aspheric surfaces.

6. The lens assembly as claimed in claim 1, wherein the fifth lens further comprises a surface, wherein the surface is an aspheric surface, or the concave surface of the fifth lens is an aspheric surface, or both of the surface and the concave surface of the fifth lens are aspheric surfaces.

7. The lens assembly as claimed in claim 1, wherein the lens assembly satisfies:

$1.34 \text{ mm} \leq f \leq 2.777 \text{ mm}$ wherein f is an effective focal length of the lens assembly.

8. A lens assembly consisting of:
    a fifth lens which comprises a convex surface facing an object side and a concave surface facing an image side;
    a sixth lens which comprises a convex surface facing the object side and a convex surface facing the image side;
    a stop;
    a first lens which is a biconvex lens;
    a second lens which is a biconcave lens;
    a third lens which is a biconvex lens and made of glass material; and
    a fourth lens which comprises a concave surface facing the object side and a concave surface facing the image side;
    wherein the fifth lens, the sixth lens, the stop, the first lens, the second lens, the third lens and the fourth lens are arranged in sequence from the object side to the image side along an optical axis;
    wherein the fifth lens is closer to the object side than the sixth lens, the first lens, the second lens, the third lens and the fourth lens;
    wherein the sixth lens is disposed between the fifth lens and the stop;
    wherein the first lens is disposed between the stop and the second lens;
    wherein the lens assembly satisfies:

$1.6 \leq F \leq 2.0$ wherein F is an f-number of the lens assembly.

9. The lens assembly as claimed in claim 8, wherein the fifth lens comprises two surfaces, at least one of which is an aspheric surface or both of which are aspheric surfaces.

10. The lens assembly as claimed in claim 8, wherein the sixth lens further comprises a surface, wherein the surface is an aspheric surface, or the convex surface of the sixth lens is an aspheric surface, or both of the surface and the convex surface of the sixth lens are aspheric surfaces.

11. The lens assembly as claimed in claim 8, wherein the first lens is made of plastic material.

12. The lens assembly as claimed in claim 8, wherein the second lens is made of plastic material.

13. The lens assembly as claimed in claim 8, wherein the fourth lens is made of plastic material.

14. The lens assembly as claimed in claim 8, wherein the fifth lens is made of plastic material.

15. The lens assembly as claimed in claim 8, wherein the sixth lens is made of plastic material.

16. The lens assembly as claimed in claim 8, wherein the first lens, the second lens, the fourth lens, the fifth lens and the sixth lens are made of plastic material.

17. The lens assembly as claimed in claim 8, wherein the lens assembly satisfies:

$1.34 \text{ mm} \leq f \leq 2.777 \text{ mm}$ wherein f is an effective focal length of the lens assembly.

18. A lens assembly consisting of:
    a fifth lens which comprises a convex surface facing an object side and a concave surface facing an image side;
    a first lens which is a biconvex lens and disposed between the fifth lens and the second lens;
    a second lens which is a biconcave lens;
    a third lens which is a biconvex lens and made of glass material; and a fourth lens which comprises a concave surface facing the object side and a concave surface facing the image side;

wherein a focus shift of the lens assembly is between 0 mm and 0.0033 mm as temperature increases from 20° C. to 50° C.;

wherein the lens assembly satisfies:

$$120 \text{ degrees} \leq FOV \leq 168 \text{ degrees}$$

wherein FOV is a field of view of the lens assembly;

wherein the lens assembly satisfies:

$$1.34 \text{ mm} \leq f \leq 2.777 \text{ mm}$$

wherein f is an effective focal length of the lens assembly;

wherein the fifth lens, the first lens, the second lens, the third lens and the fourth lens are arranged in sequence from the object side to the image side along an optical axis wherein the fifth lens is closer to the object side than the first lens, the second lens, the third lens and the fourth lens.

19. The lens assembly as claimed in claim 18, further comprising a stop disposed between the fifth lens and the second lens.

20. The lens assembly as claimed in claim 18, further comprising a stop disposed between the fifth lens and the first lens.

* * * * *